United States Patent [19]

Patton

[11] Patent Number: 4,475,755

[45] Date of Patent: Oct. 9, 1984

[54] APPARATUS AND METHOD FOR ASSEMBLY-DISASSEMBLY OF A SPRING LOADED HOOK

[75] Inventor: Jerry C. Patton, Broken Arrow, Okla.

[73] Assignee: The Crosby Group, Inc., Tulsa, Okla.

[21] Appl. No.: 422,723

[22] Filed: Sep. 24, 1982

[51] Int. Cl.[3] .......................... B66C 1/34; B23P 19/04

[52] U.S. Cl. .................................... 294/82 R; 29/259; 254/392; 254/409

[58] Field of Search ............... 254/277, 392, 409, 414, 254/399, 273; 24/280.5 R; 294/82 R; 29/256, 258, 259, 260, 263, 264, 265, 266, 227

[56] References Cited

U.S. PATENT DOCUMENTS

| | | | |
|---|---|---|---|
| 2,513,990 | 7/1950 | Bennett | 294/82 R |
| 2,613,981 | 10/1952 | Minor | 294/82 R |
| 2,814,522 | 11/1957 | Palmer et al. | 294/82 R |
| 3,078,556 | 2/1963 | Carroll | 29/259 X |

*Primary Examiner*—Stuart S. Levy
*Assistant Examiner*—Joseph J. Hail, III
*Attorney, Agent, or Firm*—Head, Johnson & Stevenson

[57] ABSTRACT

A spring loaded hook having an apparatus which forms a part of the assembly and which can be used by field or manufacturing personnel to disassemble and/or assemble the hook parts for maintenance or repair by a controlled compression and release of the spring.

7 Claims, 6 Drawing Figures

APPARATUS AND METHOD FOR ASSEMBLY-DISASSEMBLY OF A SPRING LOADED HOOK

BACKGROUND OF THE INVENTION

This invention is directed to the broad field of block and hook assemblies and, in particular, to blocks and hooks used in oilfield service. In the pulling and replacement of extensive lengths of tubing, casing or sucker rods used in oilwells, the flexible nature and the weight thereof must be absorbed, especially when travel stops, otherwise parting may take place with the tubing, casing or sucker rods dropping in the well. Spring-loaded hooks have been used heretofore to act as an absorber of the motion. The problem with such hooks is the assembly and disassembly of the hook because of the heavy-duty pre-compressed coil spring. Assembly and disassembly of the hook is required for scheduled maintenance and inspection and/or replacement of the parts. Many times this must be done at the field of use level as it is inconvenient to return the equipment to the factory. In addition, dirt and corrosion on many of the parts make them difficult to remove and reassemble especially in a field or on-site operation.

SUMMARY OF THE INVENTION

It is an object of this invention to provide a spring loaded hook that overcomes the problem of prior art devices heretofore known.

It is another object of this invention to provide a method and apparatus for easy field disassembly and assembly of spring loaded hooks used in conjunction with tubing blocks and to provide a spring loaded hook that remains sealed from dirt and corrosion.

It is another object of this invention to provide apparatus which forms not only a part of the hook assembly but which is used with a minimum of specialized or non-assembly parts or tools, to assemble and disassemble the spring loaded hooks.

These and other objects of the invention will become readily apparent on further review of the drawings, descriptions and claims herein.

DETAILED DESCRIPTION OF THE PREFERRED EMBODIMENT

Before explaining the present invention in detail, it is to be understood that the invention is not limited in its application to the details of the construction and arrangement of parts illustrated in the accompanying drawings. The invention is capable of other embodiments and of being practiced or carried out in a variety of ways. It is to be understood that the phraseology and terminology employed herein is for the purpose of description and not of limitation.

Figure 1:
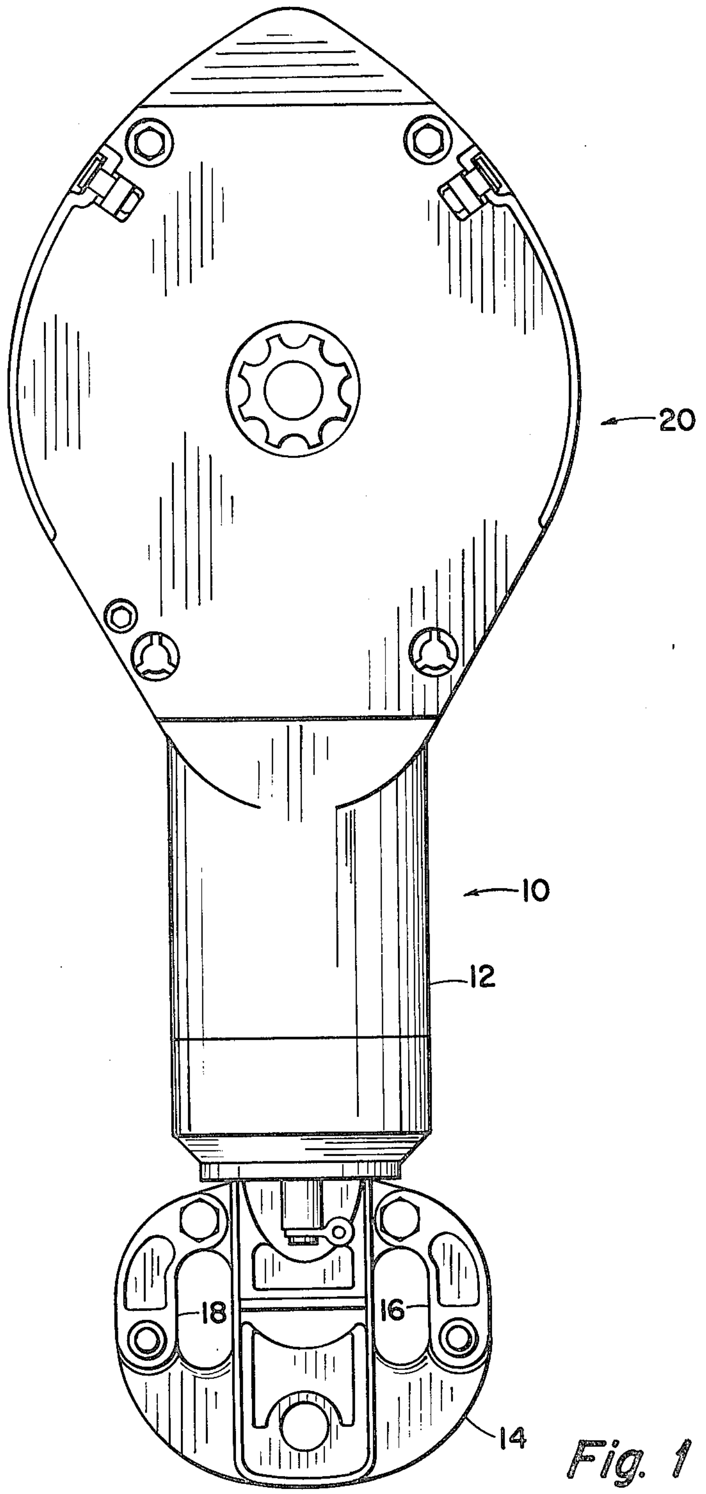
FIG. 1 is a front elevational view of the hook and block assembly.

Referring now to FIG. 1, the hook section of this invention is generally designated by the numeral 10, which is attached at the top to a pulley-block section, generally designated by the numeral 20. The hook section includes a swivel case 12 to which is attached the hook 14 having portions hereinafter described for rotation and reciprocation within and relative to the case 12. The hook shown in the embodiment includes arms 16 and 18 which can be opened for retention of other pulling devices, such as, tubing block arms, although this is not to be limited as other types of hooks are within the scope of this invention.

Figure 2:
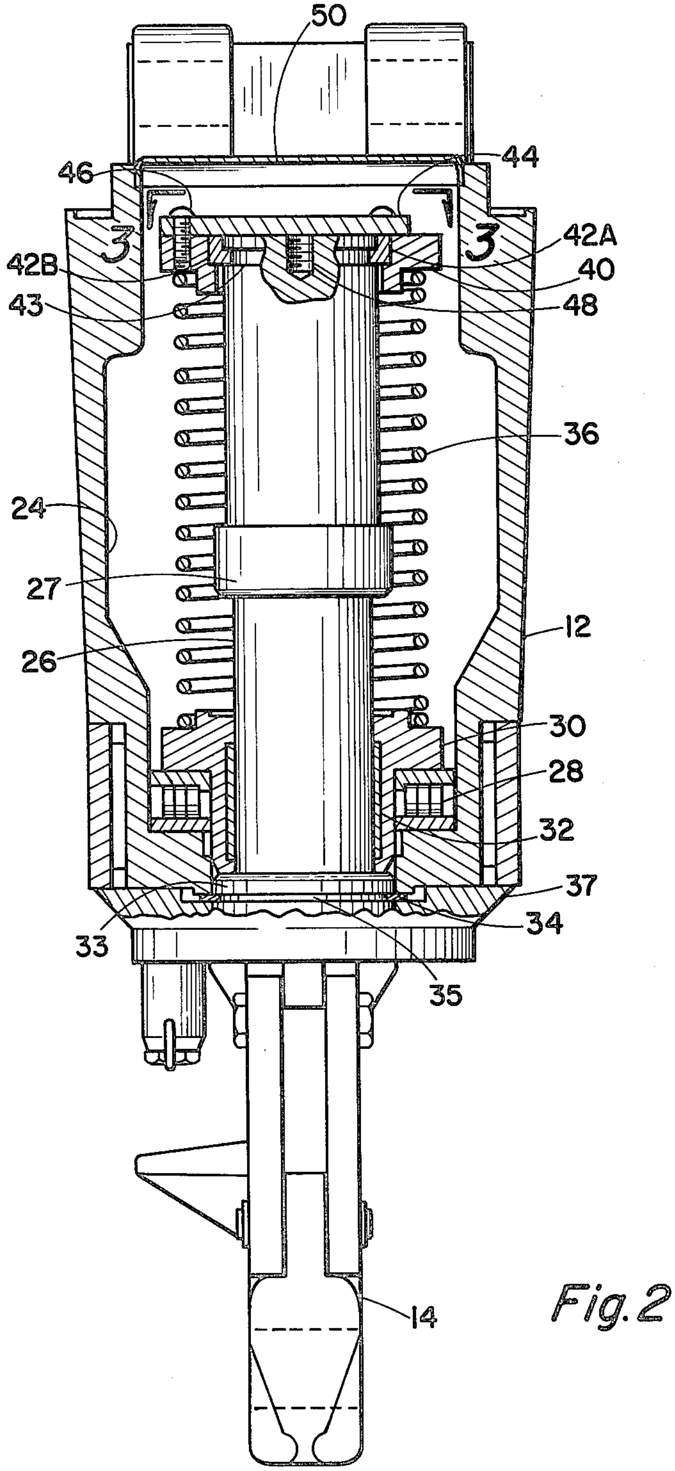
FIG. 2 is a side elevational view, partly in cross-section of the hook portion of FIG. 1.

Referring now to FIG. 2, the swivel case 12 includes an interior chamber 24 within which the assembly of parts within the scope of this invention are positioned and sealed. The hook 14 includes within the case a shank 26 which is rotatably supported within the case 12 by thrust bearing 28. The bearing assembly includes a thrust follower 30 which rests upon the bearing 28, and a follower bushing 32 surrounding the shank 26. The thrust follower 30 and bushing 32 may be split to accomodate assembly. Spaced stop sleeves 27 and 33 are formed as a part of shank 26, and act as members to limit the respective downward and upward movement of the shank. Stop sleeve 33 includes a retaining ring 34 partially in groove 35 which abuts against the bottom of case 12 to limit the upward movement, and abuts against plate 37 allowing plate 37, shank 26 and hook 14 to move downward together. A pre-compressed coil spring 36 is positioned about the shank 26, as shown, between the follower 30 at the bottom end and retainer ring 40 at the top end. Half ring keepers 42A and 42B of a L-shape in cross-section have their lower leg positioned within a retention groove 43 formed in the top of the shank 26. The assembly is held together by a cap plate 44 and a plurality of threaded bolts 46 which extend through the cap plate into threaded openings in the retainer 40. A central threaded opening 48 usually includes a set screw therein which opening forms an important function in the assembly and disassembly of the apparatus shown. A cover or weather cap 50 acts to seal member to the top of the chamber 24.

Figure 3:
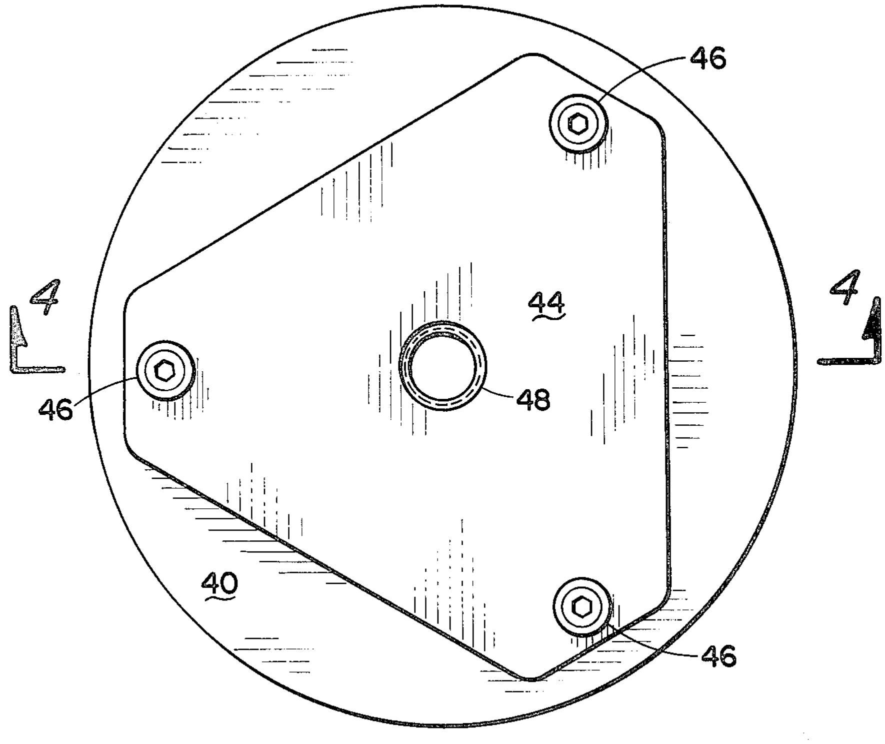
FIG. 3 is a top view taken along the lines 3—3 of FIG. 2.
Figure 4:
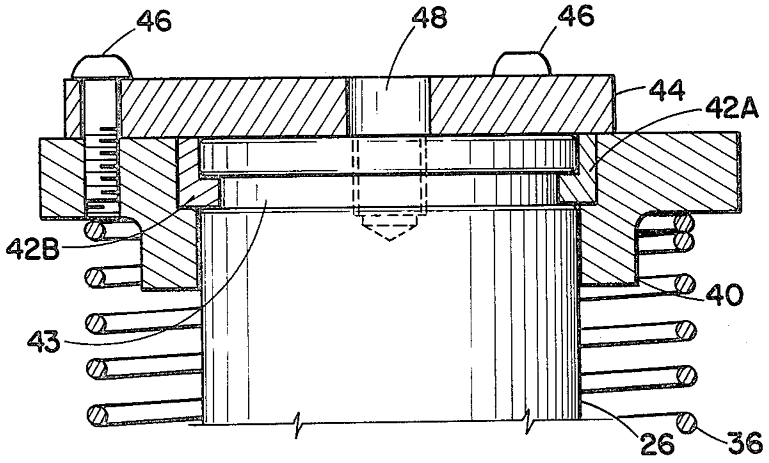
FIG. 4 is a partial cross-sectional view taken along the lines 4—4 of FIG. 3.

FIG. 3 is an apt description of the cap plate 44 of this invention which is shown in a generally triangular shape relative to the retainer 40. FIG. 4 is an enlarged view of the coil spring retention system as shown in FIG. 2.

Figure 5:
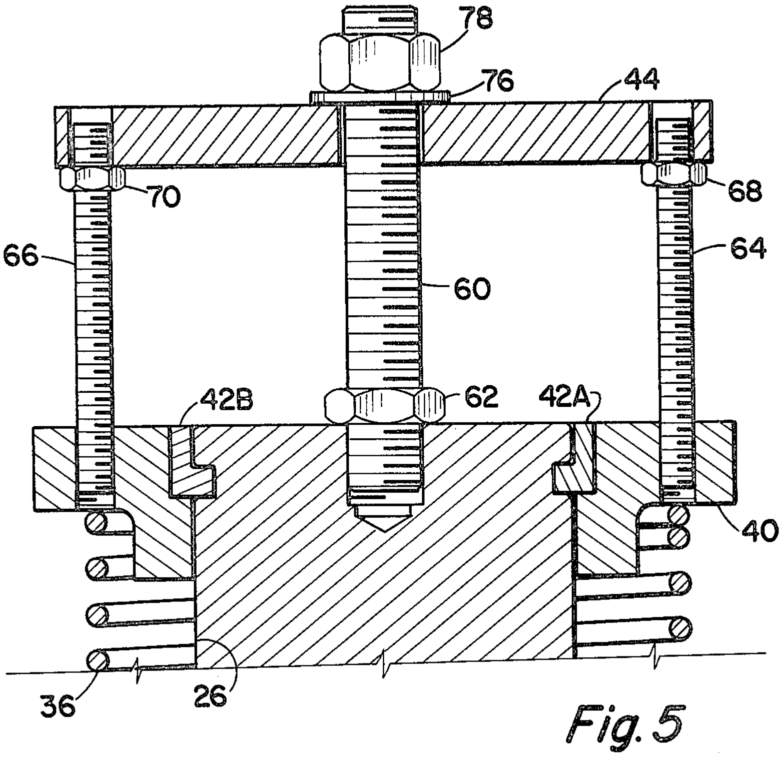
FIGS. 5 and 6 are partial sectional views describing the method of disassembly.
Figure 6:
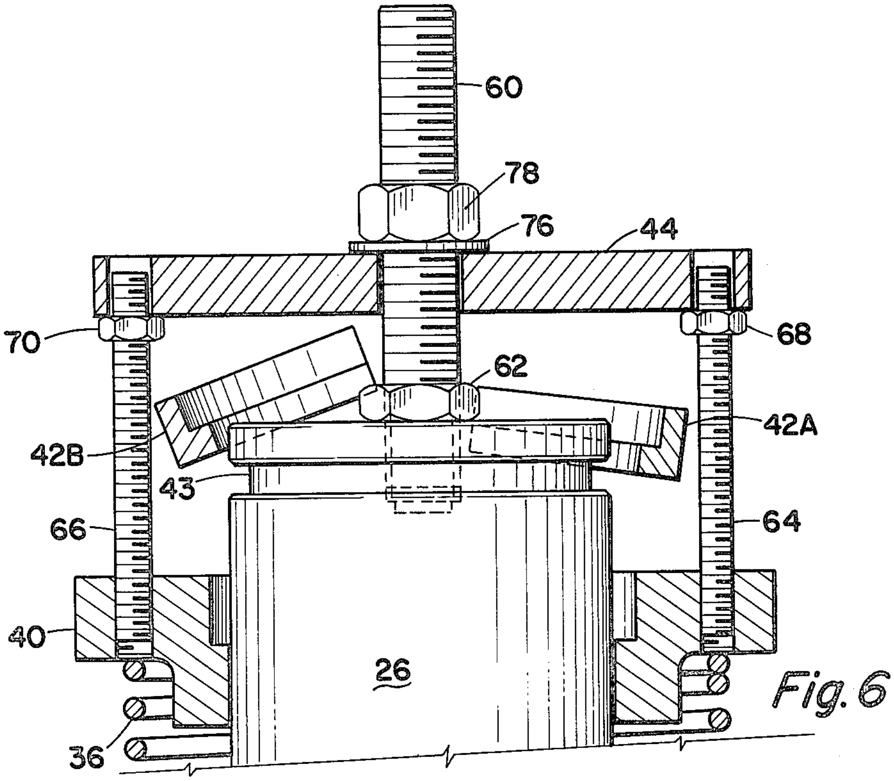

Reference is now made to FIGS. 5 and 6 of this invention which describe the method of safe disassembly and assembly of the pre-compressed spring 36 and its associated hook and shank parts.

To disassemble, the weather cap 50 is removed from the top of the case, exposing the top parts of the hook assembly best shown in FIGS. 3 and 4. The bolts 46 are removed and the cap plate 44 is lifted out of the case. The set screw 48 is removed and an all-thread 60 is installed in the threaded recess normally receiving the set screw 48. A hex-nut 62 is then threaded so as to seat against the top of the shank 26 and lock the all-thread 60 thereto. Three additional all-threads, of which only two, 64 and 66, are shown, are then threaded into the retainer 40. Each of the all-threads 64 and 66 include hex-nuts 68 and 70 as shown which are placed at a position which will provide an imaginary level plane. The cap plate 44 is then positioned over the tops of the all-threads so as to rest on the hex-nuts 68 and 70, with the all-thread 60 extending upward through the center opening of the cap plate 44. A washer 76 and a hex-nut 78 are then threaded onto the top of the all-thread 60. Continued rotation moves the cap plate 44 downward along with its associated all-threads 64 and 66 and retainer 40 to compress the spring. This action is shown in FIG. 6. The compression of the spring continues until the two semi-circle keeper rings 42A and 42B can be pulled away from the groove 43 in the hook shank 26. The hex-nut 78 is then turned in the opposite direction until the spring tension is completely released maintaining the jam-nut 62 in a tightened condition against the top of the hook shank 26. When the tension on the spring 36 is slack and the hex-nut 78 and washer 76 removed, the parts within the interior chamber 24 of the swivel case 12 are then available for assembly inspection, repair and reassembly. That is, the spring 36, follower 30 and follower bushing 32 and thrust bearing 28 are now free for removal through the top of the case 12. The hook 14 and its bonnet assembly therewith are free for removal upon release of the retainer ring 34.

Reassembly of the unit is accomplished by reverse order of the above described procedure.

What is claimed is:

1. A spring loaded hook assembly having a case having an opening in the bottom and top;

an integral hook and cylindrical shank which extends through said bottom opening within said case and is rotatably supported by a thrust bearing at the inside bottom of said case;

a compression coil spring co-axially supported about said shank in said case between said thrust bearing and a retainer assembly supported at the top of said shank;

said retainer assembly comprising a locking groove around the top of said shank;

a retainer ring having means to receive the top end of said spring, a seating groove in the inner periphery of said retainer ring;

a plurality of L-shaped ring segments, a lower horizontal leg of each segment adapted to be positioned in said locking groove while the outer periphery of said L-shaped ring segments rest in said seating groove of said retainer ring, the compression of said spring holding the assembly locked in place;

a cap plate atop said shank and retainer assembly, said cap plate having threaded means to attach to said retainer ring in a first position atop said assembly for holding said L-shaped segments in said retainer assembly together and attached to said retainer ring in a second position spaced above said assembly to cause relative movement of said retainer ring to said shank for disassembly of said L-shaped segments from said retainer assembly; and means to releasably and sealably close said top opening of said case.

2. A hook assembly of claim 1 wherein said shank includes a top center threaded opening and wherein said cap plate has a central opening above and larger than said top center opening and wherein said plate is attached to said retainer ring by a plurality of threaded bolts.

3. A hook assembly of claim 2 including long threaded members between said cap plate and said retainer ring, and a long threaded member locked between said top center opening, through said central opening of said cap plate wherein a threaded nut atop said cap plate when rotated in one direction will force said retainer ring down and compress said spring whereby said L-shaped ring segments can be removed.

4. The hook of claims 1 or 2 including means to attach said case at the top thereof to a pulley block means.

5. A spring loaded hook assembly having a case with an axial opening in the bottom and top;

an integral hook and cylindrical shank which extends through said bottom opening within said case and is rotatably supported by a thrust bearing at the inside bottom of said case, a threaded opening in the top center of said shank;

a compression coil spring co-axially supported about said shank in said case between said thrust bearing and a retainer assembly supported at the top of said shank;

said retainer assembly comprising a locking groove around the top of said shank;

a retainer ring having means to receive the top end of said spring, a seating groove in the inner periphery of said retainer ring;

a plurality of L-shaped ring segments, a lower horizontal leg of each adapted to be positioned in said locking groove while the outer periphery of said L-shaped ring segments rest in said seating groove of said retainer ting, the compression of said spring holding the assembly locked in place;

a cap plate atop said shank and retainer assembly and attached to said retainer ring, said cap plate having a central opening above and larger than said threaded opening in said shank, said plate being attached to said retainer ring by a plurality of threaded bolts; and removable means to sealably close said top opening of said case.

6. A hook assembly of claim 5 when said removable means is removed including long threaded members between said cap plate and said retainer ring, and a long threaded member locked between said top center opening, through said central opening of said cap plate wherein a threaded nut atop said cap plate when rotated in one direction will force said retainer ring down and compress said spring whereby said L-shaped ring segments can be removed.

7. The hook of claim 5 including means to attach said case at the top thereof to a pulley block means.

* * * * *